Patented Sept. 6, 1932

1,875,552

UNITED STATES PATENT OFFICE

RALPH C. BATEMAN, OF AKRON, OHIO, ASSIGNOR TO THE GOODYEAR TIRE & RUBBER COMPANY, OF AKRON, OHIO, A CORPORATION OF OHIO

MOLD CLEANING SOLUTION

No Drawing. Application filed October 28, 1929. Serial No. 403,123.

This invention relates to cleaning solutions, more particularly to solutions which are applicable in cleaning the molds employed in the vulcanization of rubber.

One of the objects of the invention is to provide a solution which will readily penetrate and soften the incrustations which accumulate in such molds during use.

Most rubber articles are subjected to vulcanization in molds which impart the desired form thereto while the compound from which they are prepared is in plastic condition. During the vulcanization, a certain amount of rubber and other organic material, intermixed with the talc employed as a dusting material, adheres to the surface of the mold. If the molds are not cleaned occasionally, such incrustations become so thick and heavy that they tend to mar the surface of the articles being vulcanized. For that reason, it is necessary to subject the molds to a cleaning operation which may be conveniently effected by subjecting the incrustations to the action of a softener, followed by a process of mechanical brushing or scraping. Although various softeners, such as solutions of alkali, have heretofore been employed, none of these has been as effective as desired, because of the high degree of insolubility of the incrustations.

This invention resides in the discovery that cresol, particularly when intermixed with a suitable penetrating oil, is an excellent softening agent for mold incrustations, readily reducing the latter to a relatively soft condition and decreasing the adhesion between them and the surface so that they may be removed with ease. Although various solvents may be employed for the cresol, it has been found by experience that a solvent which is of such penetrating character that it is readily absorbed by the incrustations is most effective. In general, the more pronounced the tendency of the solvent to penetrate ordinary materials, the more effective the cleaning solution will be.

In the manufacture of the cleaning solution, approximately equal proportions of solvent and cresol are intermixed, after which the solution is ready to be applied to the surfaces to be cleaned. Following the application of the cleaning solution, the molds should preferably be heated for a relatively short period of time (usually about ten minutes) in steam under a pressure of approximately fifty or sixty pounds per square inch. They are then subjected to mechanical brushing in order to remove any loose particles. This treatment is followed, if necessary, by a second application of the cleaning solution. Finally, the mold is brushed and subjected to the action of a steam jet in order to remove the remainder of the incrustations.

Excellent results may be obtained by employing a solution consisting of cresol and turpentine or a solution consisting of cresol and ordinary pine oil, which has the power of penetrating the incrustations. In place of the turpentine or pine oil, other penetrants may be employed, as for example, the fraction obtained between 180 and 200 degrees C. in the fractionation of the steam distillate of pine wood, particularly pine stumps.

The cresol solutions above described are relatively inexpensive to prepare and their application is extremely simple. Also, the period required for their action is relatively short and a thorough cleaning is obtained. Molds, particularly nickel plated molds, cleaned by the above described method, exhibit much less tendency to become fouled by incrustations than untreated molds or molds treated by ordinary methods.

Although I have described only the preferred forms which the invention may assume, it will be apparent to those skilled in the art that it is not limited thereto, but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of cleaning molds employed in the vulcanization of rubber which comprises subjecting them to heat in the presence of a mixture of cresol and a penetrant selected from a group embracing pine oil, turpentine and the fraction obtained between 180 and 200 degrees C. in the fractionation of the steam distillate of pine wood.

2. A method of cleaning molds employed in the vulcanization of rubber which comprises subjecting them to the action of heat in the presence of a solution of cresol and turpentine followed by subsequent mechanical removal of loosened material.

3. A method of cleaning molds employed in the vulcanization of rubber which comprises subjecting them to the action of heat in the presence of a solution of cresol and pine oil.

4. A method of cleaning molds employed in the vulcanization of rubber which comprises subjecting them to the action of heat in the presence of a mixture of approximately equal proportions of cresol and a penetrant selected from a group embracing pine oil, turpentine and the fraction obtained between 180 and 200 degrees C. in the fractionation of the steam distillate of pine wood.

5. A method of cleaning molds employed in the vulcanization of rubber which comprises subjecting them to the action of heat in the presence of a mixture of approximately equal proportions of cresol and turpentine followed by subsequent mechanical removal of loosened material.

6. A method of cleaning molds employed in the vulcanization of rubber which comprises subjecting them to the action of heat in the presence of a mixture of approximately equal proportions of cresol and pine oil.

In witness whereof, I have hereunto signed my name.

Signed at Akron, in the county of Summit and State of Ohio, U. S. A., this 26th day of October, 1929.

RALPH C. BATEMAN.